US00RE39958E

(19) United States
(12) Reissued Patent
Cech et al.

(10) Patent Number: US RE39,958 E
(45) Date of Reissued Patent: Dec. 25, 2007

(54) PLUG-AND-SOCKET CONNECTOR ELEMENT

(75) Inventors: Markus Cech, Ostfildern (DE); Frank Andrä, Deizisau (DE)

(73) Assignee: Contact GmbH Elektrische Bauelementa, Stuttgart (DE)

(21) Appl. No.: 11/207,205

(22) Filed: Aug. 18, 2005

Related U.S. Patent Documents

Reissue of:
(64) Patent No.: 6,840,805
Issued: Jan. 11, 2005
Appl. No.: 09/911,996
Filed: Jul. 24, 2001

(30) Foreign Application Priority Data

Jul. 28, 2000 (DE) ..... 100 36 890
Sep. 8, 2000 (DE) ..... 200 15 602

(51) Int. Cl.
*H01R 13/40* (2006.01)

(52) U.S. Cl. ..... 439/598; 439/901
(58) Field of Classification Search ..... 439/489, 439/589, 598, 686, 692, 695, 901, 910
See application file for complete search history.

(56) References Cited

U.S. PATENT DOCUMENTS 2,255,763 A * 9/1941 Doughman ..... 439/598
3,818,420 A * 6/1974 Barr ..... 439/261
4,053,198 A * 10/1977 Doyle et al. ..... 439/462
4,178,056 A * 12/1979 Lee ..... 439/472
4,688,873 A * 8/1987 Bowden et al. ..... 439/462
4,715,824 A * 12/1987 Verhoeven ..... 439/391
4,772,222 A * 9/1988 Laudig et al. ..... 439/578
5,100,345 A * 3/1992 Endo et al. ..... 439/595
5,306,157 A * 4/1994 Francisco ..... 439/52
5,586,916 A * 12/1996 Shinji et al.
6,315,600 B1 * 11/2001 Droesbeke ..... 439/460
6,840,805 B2 * 1/2005 Cech et al. ..... 439/598
2002/0065004 A1 * 5/2002 Cech et al. ..... 439/686

FOREIGN PATENT DOCUMENTS

DE G 93 11 457.5 * 7/1993
EP 0 505 199 A * 9/1992
EP 0 840 403 A * 5/1998
EP 0 926 775 A * 6/1999
FR 2 787 933 A * 6/2000

* cited by examiner

*Primary Examiner*—James R. Harvey
(74) *Attorney, Agent, or Firm*—Pierce Atwood LLP; Kevin M. Farrell; Katherine A. Wrobel

(57) ABSTRACT

The invention relates to a plug-and-socket connector element (10) comprising a base body (12) in which at least one plug contact (16) is arranged, with the at least one plug contact (16) permitting an insertion of an electric feed line (62) in an axial direction from the rear end of the at least one plug contact (16), and a fitting part (14) which is preferably movable in an axial direction with respect to the base body (12) which at the rear end permits a lateral access to the at least one plug contact (16) in a first latch position and, in a second latch position, laterally covers the at least one plug contact (16) at least partially.

15 Claims, 4 Drawing Sheets

PLUG-AND-SOCKET CONNECTOR ELEMENT

Matter enclosed in heavy brackets [ ] appears in the original patent but forms no part of this reissue specification; matter printed in italics indicates the additions made by reissue.

*RELATED APPLICATIONS*

*The present application claims priority to German Application No. 100 36 890.5, filed Jul. 28, 2000, and German Application No. 200 15 602.0, filed on Sep. 8, 2000, the entire contents of which are incorporated by reference.*

BACKGROUND OF THE INVENTION

The invention relates to a plug-and-socket connector element with a connector base body, a connector fitting part, and at least one plug contact.

Conventional plug-and-socket connector systems comprise two complementary connector elements. One of the two connector elements is generally provided with plug contacts in the form of sockets, and the other connector element complementary therewith is provided with plug contacts in the form of pins.

During assembly of plug-and-socket connector elements, electric feed lines such as cables are connected to the plug contacts, for example via clamping screws which are arranged at the rear end of the plug contacts. The rear end of a plug contact is the end facing away from the complementary connector element.

Due to the fact that high voltages can be applied to the plug contacts it is generally necessary to provide predefined insulating air and creep paths for a certain rated voltage. For this reason, an insulation protection in the form of a fitting part is often provided for the plug contacts which are arranged in the base body of the connector element. The fitting part covers the rear ends of the plug contacts in such a manner that the required insulating air and creep paths are maintained.

Such fitting parts are often provided with latch elements which are employed for various purposes. The latch elements, for example, permit the coupling of the fitting part with the base body or of a first connector element with a complementary second connector element. It is also possible to couple by means of the latch elements one of the connector elements with a support rail for the connector system.

German Utility Model DE GM 93 11 457 describes plug-and-socket connector fitting parts which are connected with opposite faces of a connector element by means of screws. The fitting parts each have a side wall extending in parallel to the faces of the connector element as well as a movable latch element in the form of a latch hook. The latch hook is arranged at an outer end of a lever arm which is part of a two-arm lever. The lever is pivotably coupled with the side wall via a web which extends radially outwards with respect to the plug-in direction of the connector element. The latch hook is connected to the side wall of the fitting part via the lever arm and the web.

The object underlying the invention is to provide a plug-and-socket connector system which permits a simple connection of the electric feed lines, is easy to handle, and which, beyond that, ensures a protection and, in particular, a reliable electric insulation of the rear ends of the plug contacts.

SUMMARY OF THE INVENTION

This object is solved by a plug-and-socket connector element with a base body in which at least one plug contact is arranged, wherein the plug contact permits the insertion of an electric feed line in an axial direction from the rear end of the at least one plug contact. The plug-and-socket connector element moreover comprises a fitting part which is movable with respect to the base body and can preferably be snapped onto the base body, the fitting part permitting a lateral access to the rear end of the at least one plug contact in a first latch position and, in a second latch position, laterally covers the plug contact at least partially. The plug contact can, for example, be covered in the second latch position by a circumferential side wall or a side wall provided with openings. The side wall can be made from an insulating material. The fitting part is preferably brought from the first into the second latch position by an axial displacement or, alternatively, by a rotating movement.

The inventive connector element ensures a particularly simple connecting of the electric feed lines to the plug contacts in that the feed lines are inserted from the rear end of the plug contacts into same. In the first latch position (assembly position) the lateral access to the at least one plug contact enables to secure the feed lines at the plug contacts, e.g. by means of clamping screws or soldering. After securing of the electric feed lines, the fitting part is brought into the second latch position (work position) with respect to the base body. In the work position, the fitting part laterally covers the plug contacts at least partially so that the connection between each plug contact and feed line is protected, for example, against mechanical damage or an inadvertent disconnection.

Preferably, at least the portion of the fitting part covering the rear end of the plug contacts consists of an insulating material such as plastic. The base body can also consist of an insulating material. By manufacturing at least the portion of the fitting part covering the rear end of the plug contacts of an insulating material, insulating air and creep paths can be maintained, if required.

Due to the fact that the fitting part is in a latch position both in the assembly position and in the work position, it is ensured that the fitting part does not interfere with the assembly of the electric feed lines through an inadvertent displacement. It is further ensured that the fitting part in the work position reliably covers the one or more plug contacts. Preferably, the fitting part is designed in such a manner that it can optionally be brought from the assembly position into the work position and vice versa.

An inventive connector fitting part has a side wall and at least one latch element connected with the side wall, wherein the side wall of the fitting part comprises one or several expandable areas which are connected with one or more latch elements each. Due to the connection of the latch element with the movable expandable area of the side wall, a latching connection between the fitting part and another component (e.g. the base body) having a complementary latch element can be realized in an easy manner.

The latch element can be formed as one piece with the expandable area, i.e. can be integrated in the expandable area, or it can be arranged as a separate component on the expandable area. The integration of the latch element via the expandable area into the side wall allows a reduction of the material costs compared to a fitting part at whose side wall a separate lever carrying the latch element is arranged by means of e.g. a web.

The expandable area preferably has resilient properties so that after an actuation, the latch element attempts to return into its initial position. In lieu of designing the expandable area itself so as to be resilient, it is also conceivable to provide separate resilient means which move the expandable area, and thus the latch element, after an actuation back into the initial position.

According to a preferred embodiment of the invention, the expandability of the resilient or not resilient, expandable area is realized by one or several folds of the expandable area. Thus, the expandable area can be designed similar to a bellows.

The latch element which is preferably surrounded at least on two sides or completely by the expandable area can be designed as a latch hook, a latch projection, or a latch recess. It is, for example, conceivable to design the latch element as a latch hook which, for the purpose of forming a latching connection, engages behind a corresponding latch projection or into a corresponding latch recess.

The latch element is preferably movable in a radial direction with respect to a longitudinal axis of the fitting part. An actuation mechanism can be provided for the latch element, which, for example, actuates the latch element due to a pressure acting on the actuation mechanism. According to a preferred embodiment, the actuation mechanism comprises an actuation lever with a first lever arm, the latch element being connected with said first lever arm. The first lever arm can be integrated at least almost completely in the expandable area. The lever arm is then part of the side wall of the fitting part.

The actuation lever can comprise a second lever arm which, at least partially, protrudes off the side wall. For operating the actuation mechanism, a force may be introduced into a section of the second lever arm protruding off the side wall. Thus, a pivoting movement of the latch element is effected. The actuation mechanism is preferably designed in such a manner that it allows a movement of the latch element in a radially outward direction with respect to the plug-in direction.

In order to prevent an inadvertent disconnection of the plug contacts from the base body, the fitting part may be provided with at least one extension which extends in an axial direction towards the base body. Said extension, which can be arranged between the side faces of the fitting part, cooperates with a plug contact in such a manner that the extension in the first latch position locks the plug contact axially displaceably against falling out, and in the second latch position locates the plug contact in an axially non-displaceable manner in the base body. Additionally or alternatively it is conceivable to secure such plug contacts, which may be arranged in respective chambers of the base body, by means of bulges in the chambers against becoming lost.

According to another embodiment of the invention, the fitting part is movable in a guided manner in an axial direction with respect to the base body. For this purpose, the fitting part or the base body is provided with a guide groove extending e.g. in an axial direction, and the base body or the fitting part has a corresponding projection which is guided in the guide groove. In addition, the fitting part can be captivity connected with the base body. To achieve this, the guide groove, for example, is limited at opposite ends by means of corresponding stops for the guided projection.

In order to secure the feed lines at the plug contacts, the plug contacts are preferably provided with clamping screws in the area of the rear side of the plug contacts. These clamping screws can extend in a radial direction with respect to the axial extension of each of the plug contacts. The connector element can be designed both as a round and a rectangular connector element. According to a particularly preferred embodiment of the invention, the connector element is a standardized H-A 3 or H-A 4 insert. A preferred connector element has at least two, and preferably at least four plug contacts. Each plug contact can be adapted for cable connection cross sections of 0.5 to 2.5 mm. In addition, the connector element can be provided with a ground connection.

DESCRIPTION OF THE DRAWINGS

Further advantages and details of the invention will become apparent from the following embodiments and the figures, in which.

DESCRIPTION OF PREFERRED EMBODIMENTS

Figure 1:
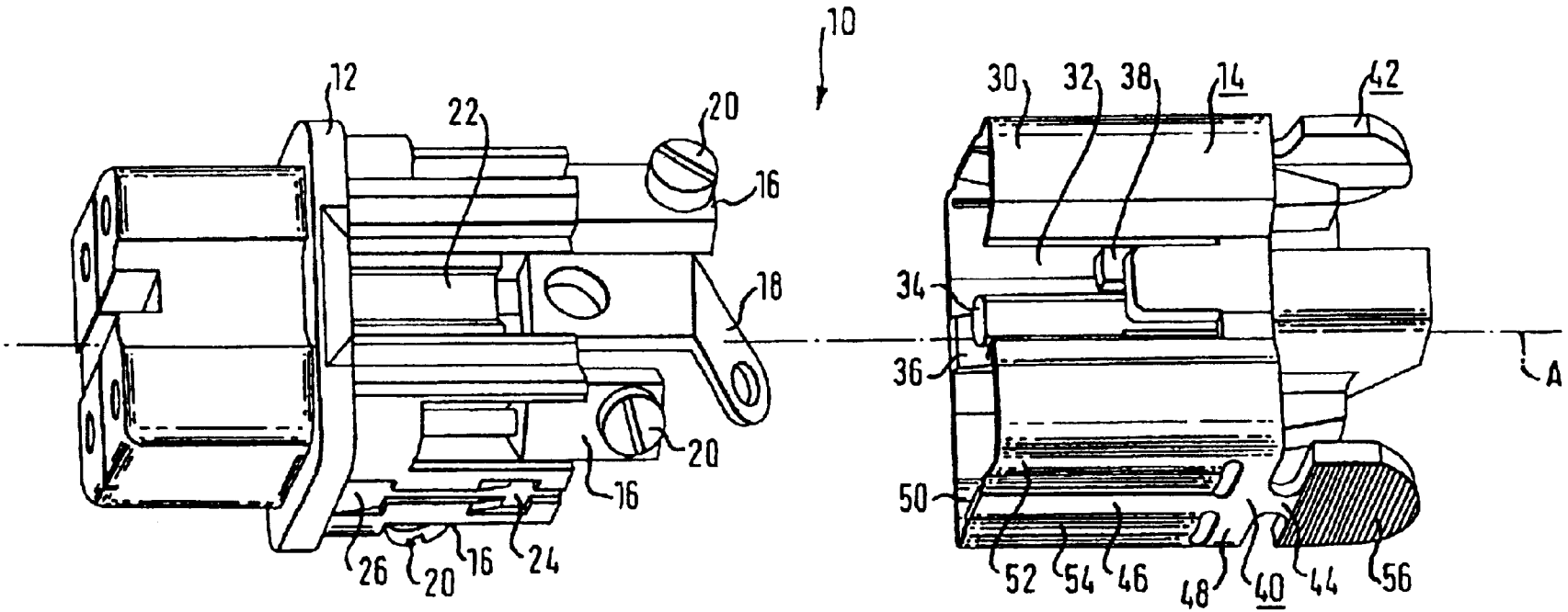
FIG. 1 shows a first embodiment of an inventive plug-and-socket connector element prior to the assembly of base body and inventive connector fitting part.

FIG. 1 illustrates a first embodiment of an inventive plug-and-socket connector element 10 in the form of an H-A 3 socket insert. The connector element 10 comprises a two-part insulating body 12, 14 consisting of a base body 12 and an inventive connector fitting part 14. Both the base body 12 as well as the fitting part 14 are completely made from plastic.

The base body 12 is designed for the accommodation of four socket plug contacts 16 and one ground connection 18. FIG. 1 shows three plug contacts 16 of the altogether four plug contacts 16. Each of the plug contacts 16 is provided at its rear end with a clamping screw 20 for the securing of cables.

The plug contacts 16 are inserted into contact chambers, which are not shown in FIG. 1, of the base body 12. In the illustration according to FIG. 1, a first of the plug contacts 16 has not yet been inserted, a second of the plug contacts 16 has been inserted halfway, and a third of the plug contacts 16 has been fully inserted into the respective contact chamber. The ground connection 18, which comprises two sections extending towards each other at right angles, can be inserted into a guide groove 22 of the base body 12. The guide groove 22 extends in an axial direction. The section of the ground connection 18 which extends vertically to a longitudinal axis A of the connector element 10 comes to rest against the rear end surface of one of the plug contacts 16. Consequently, this plug contact 16 acts as a ground contact.

In order to enable snapping-on of the fitting part 14 on the base body 12, two opposite rear side walls of the base body 12 are provided with two latch recesses 24 and 26 each, which are offset in an axial direction. FIG. 1 shows only one of the side faces of the base body 12 with the latch recesses 24 and 26.

Another guide groove extending in an axial direction is formed on that rear side face of the base body 12, which is located opposite the side face comprising the guide groove 22 for the ground connection 18 and which is not shown in FIG. 1. This further guide groove is terminated at its two axial ends by one stop each which extends vertically to the longitudinal axis A.

The fitting part 14 of the connector element 10 shown in FIG. 1 comprises a side wall 30 which extends towards the base body 12 in an axial direction. This side wall 30, however, is not designed so as to be fully circumferential, but has an opening 32 for enabling a laterial access to the ground connection 18 also in the work position of the fitting part 14 with respect to the base body 12.

A guide pin 34 is arranged in the center of the fitting part 14 and extends towards the base body 12 in an axial direction. This guide pin 34 has an asymmetric cross section. Upon snapping on of the fitting part 14 the guide point 34 cooperates with a corresponding opening of the base body 12. The opening has a corresponding cross section and extends in an axial direction, in order to enable a snapping-on of the fitting part 14 on the base body 12 in the correct position.

On its side opposite the opening 32, the side wall 30 of the fitting part 14 comprises a projection 36 in the form of a latch hook which protrudes from the plane of the drawing. This projection 36 cooperates with that guide groove of the base body 12 which is not shown in FIG. 1 and located opposite the guide groove 22. The projection 36 of the fitting part 14 and the corresponding guide groove of the base body 12 ensure, on the one hand, that the fitting part 14 is captively connected with the base body 12 and, on the other hand, a reliable axial guidance of the fitting part 14 on the base body 12 between the two possible latch positions.

In addition, the fitting part 14 is provided with one extension 38 each for each plug contact 16. The extension 38 extends towards the base body 12 in an axial direction. FIG. 1 shows only one of the altogether four extensions 38. Each of the extensions 38 cooperates with the corresponding plug contact 16 and, in the assembly position of the fitting part 14, limits the axial movability of each of the plug contacts 16. In the work position of the fitting part 14, each of the plug contacts 16 is held in an axially immovable manner in the base body 12 by these extensions 38.

The fitting part 14 comprises two actuation levers 40 and 42. These actuation levers 40 and 42 are formed at opposite side faces of the fitting part 14. Due to the fact that the two actuation levers 40 and 42 are designed identical, in the following the actuation lever 40 will be described in more detail by way of example.

The actuation lever 40 comprises a first lever arm in the form of an actuation arm 44 which extends away from the base body 12 in an axial direction, as well as a second lever arm 46 which extends towards the base body 12 in an axial direction. The two lever arms 44 and 46 are connected with each other and with the fitting part 14 via a web 48 which extends vertically to the longitudinal axis A of the connector element 10.

At its end facing towards the base body 12, the lever arm 46 is provided, with respect to the longitudinal axial A of the connector element 10 radially on its inside, with a latch element. The latch element is a latch hook 50 extending towards the longitudinal axis A. This latch hook 50 cooperates with the two latch recesses 24 and 26 of the corresponding side wall of the base body 12.

The lever arm 46 provided with the latch hook 50 is integrated in the side wall 30 of the base body 12 via one expandable area 52 and 54 each. The expandable areas 52 and 54 are designed in a bellows-type manner and therefore, through the operation of the actuation lever 40, allow a movement of the latch hook 50 formed at the lever arm 46 with respect to the longitudinal axis A in a radial direction and outwardly against the restoring force generated by the expandable areas 52 and 54.

The fitting part 14 comprising the side wall 30, the expandable areas 52 and 54, and the actuation levers 40 and 42 is designed as an integral component and can therefore be manufactured extremely easily and economically. The thickness of the side wall 30 in the region of the lever arm 46 is greater than that of the expandable areas 52 and 54 or of the other regions of the side wall 30. The thickness of the side wall 30 is preferably lowest in the region of the expandable areas 52 and 54.

In order to ensure an ergonomically easy actuation of the actuation lever 40, the lever arm 44 which extends away from the base body 12 in an axial direction is provided with an actuation surface 56. This actuation surface 56 lies in the plane defined by the expandable areas 52, 54 and the lever arm 46. Like the lever arm 44, the actuation surface 56 projects beyond the side face 30.

In the delivery condition of the connector element 10 of FIG. 1, the fitting part 14 is snapped on the base body 12 in such a manner that a latch connection is made between the latch hook 50 of the actuation lever 40 and the latch recess 24 of the base body 12. The latch hook of the actuation lever 42 also makes a corresponding latch connection with the base body 12. In addition, the projection 36 of the fitting part 14 is located in the corresponding guide groove of the base body 12. This first latch position (assembly position) of the fitting part 14 with respect to the base body 12 is shown in FIG. 2.

Figure 2:
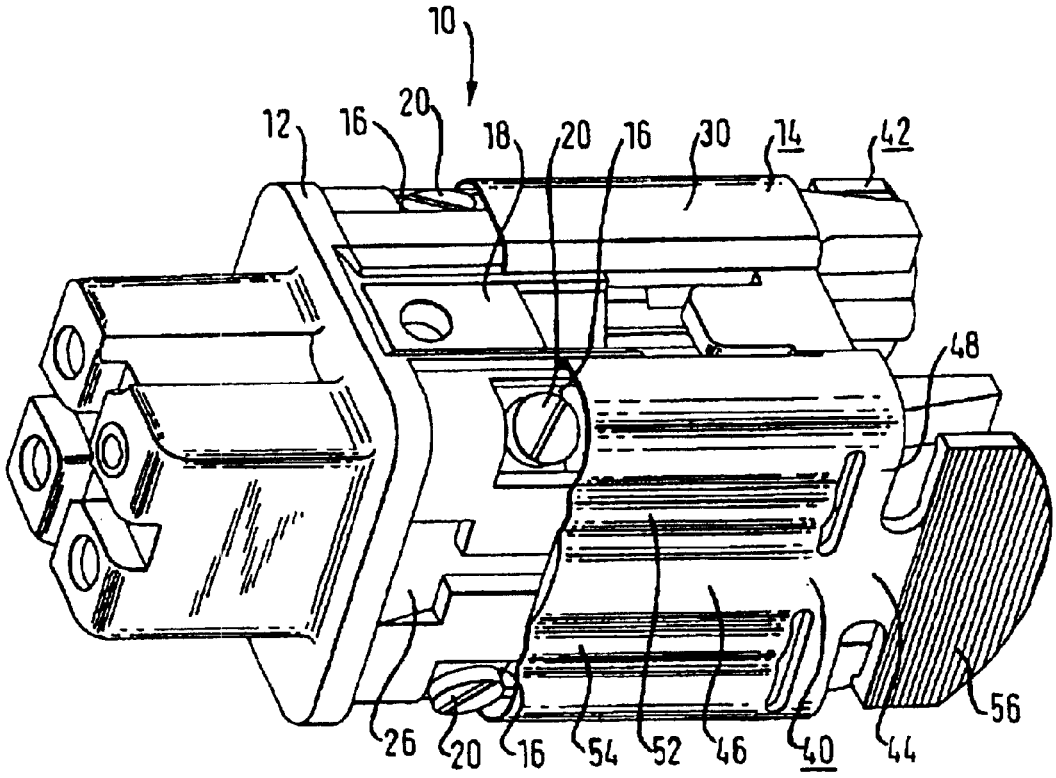
FIG. 2 shows the connector element according to FIG. 1 in a first latch position (assembly position)

In the assembly position of the fitting part 14 with respect to the base body 12 shown in FIG. 2, the fitting part 14 permits a lateral access to the clamping screws 20. From the rear end of the plug contact 16, i.e. from the right side in FIG. 2, cables with or without conductor end sleeve can be inserted into the plug contacts 16 which are desiged as clamping contacts. Following the insertion of the cables, these are connected with the plug contacts 16 by means of the clamping screws 20.

After fastening the cables, the fitting part 14 of the connector element 10 is moved towards the base body 12, i.e. to the left side in FIG. 2, until the latch hooks of the actuation levers 40, 42 engage the respective second latch recesses. This corresponds to the work position of the connector element 10 shown in FIG. 3.

Figure 3:
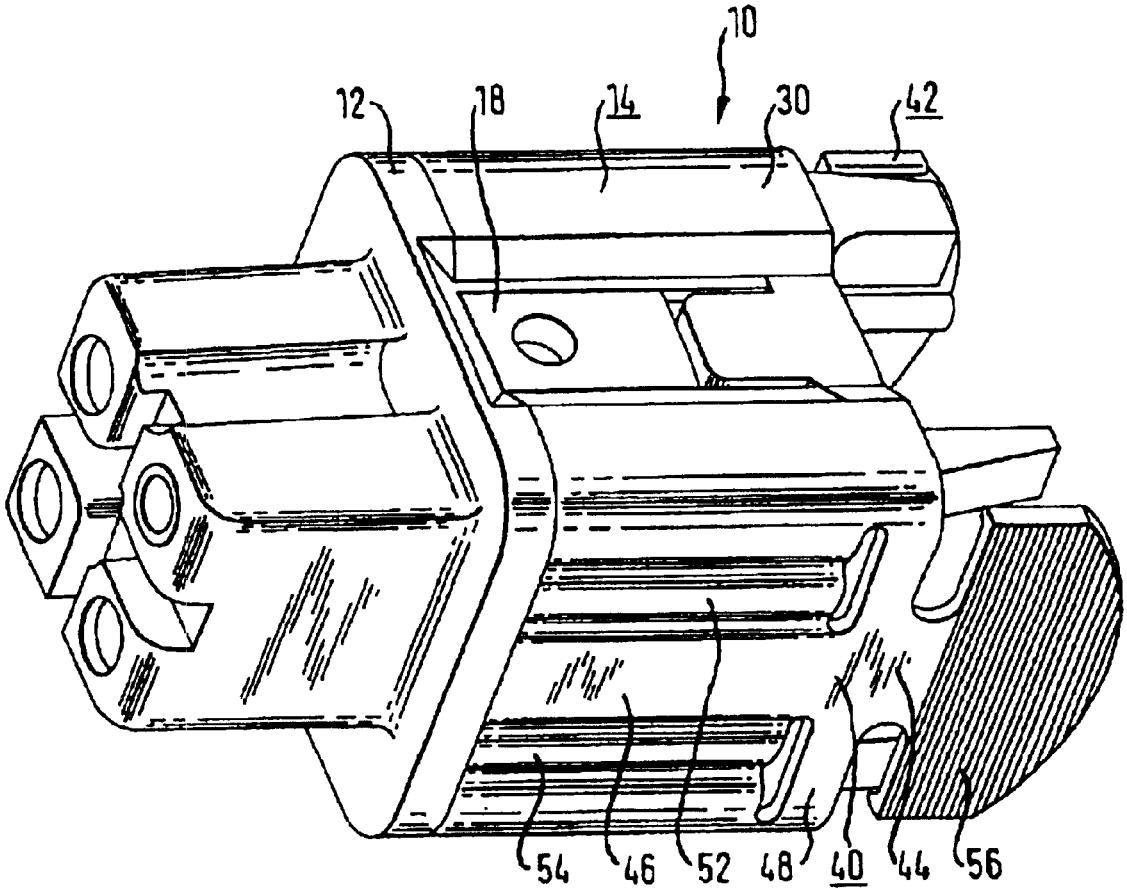
FIG. 3 shows the connector element according to FIG. 1 in a second latch position (work position)

As can be seen from FIG. 3, the plug contacts 16 shown in FIG. 2 are completely covered by the side wall 30 of the fitting part 14. The expandable areas 52 and 54 of the side wall 30 of the fitting part 14 also contribute to the covering of the plug contacts 16 depicted in FIG. 2. In the work position shown in FIG. 3, the plug contacts 16 are reliably protected against mechanical damage and, in particular, against inadvertent opening. In addition, the side wall 30 made of an insulating material ensures that specified air and creep paths for a given rated voltage are maintained. The fitting part 14 therefore acts as an insulating cap.

The latch connection between the latch hooks of the two actuation levers 40 and 42 and the corresponding latch recesses of the base body 12 is disconnected by pressing onto the actuation arms of the two actuation levers 40 and 42 towards the longitudinal axis A of the connector element 10. Consequently, after an operation of the two actuation levers 40 and 42, the fitting part 14 can be moved from the work position shown in FIG. 3 again into the assembly condition shown in FIG. 2 by means of an axial displacement away from the base body 12, i.e. to the right side in FIG. 3 (reversibility).

Figure 4:
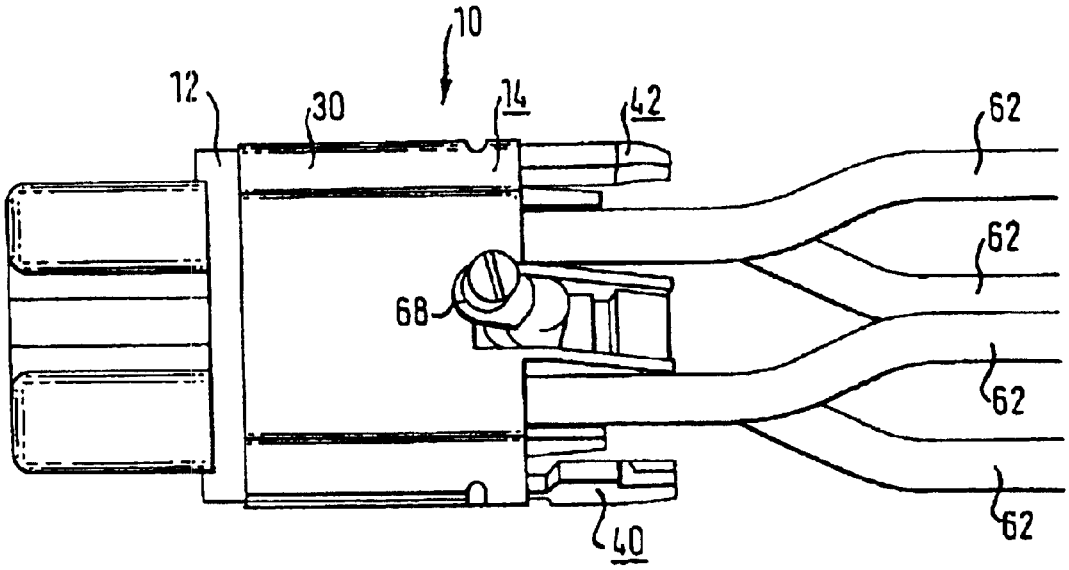
FIG. 4 shows a second embodiment of an inventive plug-and-socket connector element in the work position with the feed cables connected.

FIG. 4 shows a second embodiment of an inventive plug-and-socket connector element 10 in the form of an H-A 4 insert in the work position. The H-A 4 insert according to FIG. 4 has one more working contact than the H-A 3 insert of FIGS. 1 to 3 and consequently comprises four working contacts and one ground contact. Otherwise, the H-A 4 insert of FIG. 4 corresponds to the H-A 3 insert of FIGS. 1 to 3.

The connector element 10 according to FIG. 4 has four socket plug contacts in the form of working contacts. One cable 62 each is connected with each of these four working contacts. In addition, the connector 10 according to FIG. 4 has a fifth socket plug contact at which a protective conductor cable 68 is connected.

Whereas the three working contacts as well as the ground contact of the connector element shown in FIGS. 1 to 3 are all assembled in the assembly position shown in FIG. 2, only the four working contacts of the connector element shown in FIG. 4 are assembled in the assembly position. The assembly of the protective conductor contact is made in the work position shown in FIG. 4. The connector elements 10 shown in FIGS. 1 to 4 can be mounted in standard housings H-A 3 and H-A 4.

The inventive fitting parts explained with reference to FIGS. 1 to 4 are components for covering the base body 12 accommodating the plug contacts 16 of a two-piece plug-and-socket connector element in an electrically isolating matter. It goes without saying that the inventive connector fitting part can also be employed for other purposes in the context of a connector system. It is conceivable to provide two complementary connector elements and to secure an inventive connector fitting part at each of these connector elements in order to captively couple the two complementary connector elements by means of the two complementary connector fitting parts. An inventive fitting part which is secured at a connector element can also be used to couple the connector element, for example, with a support rail for a connector system. Furthermore, it is possible to form the inventive fitting part integrally with the connector element accommodating the plug contacts. In the sense of the invention, this case would relate to a fitting part with respect to the plug contacts.

What is claimed is:

1. A plug-and-socket connector element comprising:

a base body in which at least one plug contact is arranged, the at least one plug contact permitting an insertion of an electric feed line in an axial direction from a rear end of the at least one plug contact, and a fitting part which is movable with respect to the base body from a first latching position to a second latching position and which permits a lateral access at the rear end of the at least one plug contact to the at least one plug contact in the first latching position and, in the second latching position, laterally covers the at least one plug contact, wherein the at least one plug contact comprises a clamping screw at the rear end of the at least one plug contact, the clamping screw extending in a radial direction with respect to an axial extension of the plug contact and being accessible in the first latching position of the fitting part.

2. The plug-and-socket connector element according to claim 1, wherein the fitting part is axially movable with respect to the base body.

3. The plug-and-socket connector element according to claim 1, wherein the fitting part comprises at least one extension which extends in an axial direction, the extension cooperating with the at least one plug contact in such a manner that the extension in the first lathing position locks the plug contact against falling out and, in the second lathing position, rigidly holds the plug contact in the base body.

4. The plug-and-socket connector element according to claim 1, wherein the fitting part is captively connected with the base body.

5. The plug-and-socket connector element according to claim 1, wherein the fitting part or the base body is provided with a guide groove, and the base body or the fitting part has a projection which is guided in the guide groove.

6. The plug-and-socket connector element according to claim 1, wherein the fitting part can be reversibly reciprocated between the first latching position and the second latching position.

7. A plug-and-socket connector element comprising:

a base body supporting one or more plug contacts, and allowing feeding of an electric feed line in an axial direction towards the plug contact; and a fitting part movable with respect to the base body in a reversible manner from a first lathing position to a second latching position, wherein, in the first latching position, the fitting part permits a lateral access to each plug contact for electrically connecting the electric feed line to the respective plug contact and, in the second lathing position, the fitting part covers the plug contact at least laterally, wherein the each plug contact comprises a clamping screw at the rear end of the plug contact, the clamping, screw extending in a radial direction with respect to an axial extension of the plug contact and being accessible in the first latching position of the fitting part.

8. A plug-and-socket connector element comprising:

a base body in which at least one plug contact is arranged, the at least one plug contact permitting an insertion of an electric feed line into the plug contact in an axial direction from a rear end of the at least one plug contact, and a fitting part comprising a side wall, the side wall having at least one expandable area to which a latch element is connected, wherein the fitting part is coupled to the base body by means of the latch element so as to be movable with respect to the base body from a first latching position to a second latching position and wherein the fitting part permits a lateral access at the rear end of the at least one plug contact to the at least one plug contact in the first latching position and, in the second latching position, lateral covers the at least one plug contact, and wherein the at least one plug contact comprises a clamping screw at the rear end of the at least one plug contact, the clamping screw extending in a radial direction with respect to an axial extension of the plug contact and being accessible in the first latching position of the fitting part.

9. The plug-and-socket connector element according to claim 8, wherein the latch element is designed integrally with the expandable area or arranged on the expandable area.

10. The plug-and-socket connector element according to claim 8, wherein the expandable area possesses resilient properties.

11. The plug-and-socket connector element according to claim 8, wherein the expandable area comprises folds.

12. The plug-and-socket connector element according to claim 8, wherein an actuation mechanism is provided for the latch element.

13. The plug-and-socket connector element according to claim 12, wherein the actuation mechanism comprises an actuation lever with at least one first lever arm and the latch element is connected with the first lever arm.

14. The plug-and-socket connector element according to claim 13, wherein the actuation lever comprises a second lever arm which, at least in part, protrudes off the side wall.

15. The plug-and-socket connector element according to claim 12, wherein the actuation mechanism for moving the latch element is designed so as to extend radially outwards with respect to a plug-in direction.

* * * * *

UNITED STATES PATENT AND TRADEMARK OFFICE

CERTIFICATE OF CORRECTION

PATENT NO. : RE 39,958 E
APPLICATION NO. : 11/207205
DATED : December 25, 2007
INVENTOR(S) : Markus Cech It is certified that error appears in the above-identified patent and that said Letters Patent is hereby corrected as shown below:

Claim 3, column 7 line 60, delete “lathing” and substitute --latching--

Claim 3, column 7 line 61, delete “lathing” and substitute --latching--

Claim 7, column 8 line 10, delete “lathing” and substitute --latching--

Claim 7, column 8 line 15, delete “lathing” and substitute --latching--

Claim 8, column 8 line 37, delete “lateral” and substitute --laterally--

Signed and Sealed this

Twenty-ninth Day of April, 2008

JON W. DUDAS
*Director of the United States Patent and Trademark Office*